3,346,657
PROCESS FOR ALKYLATING AROMATIC HYDROCARBONS USING SUPPORTED HETEROPOLY ACID CATALYST
Alfred M. Henke, Springdale, and Raynor T. Sebulsky, Verona, Pa., assignors to Gulf Research & Development Company, Pittsburgh, Pa., a corporation of Delaware
No Drawing. Filed Dec. 30, 1964, Ser. No. 422,444
19 Claims. (Cl. 260—671)

ABSTRACT OF THE DISCLOSURE

A process for the alkylation of an aromatic hydrocarbon, such as benzene, with an olefinic organic compound, such as an alpha olefin, by contacting amixture of the aromatic hydrocarbon and olefinic compound at a temperature between 100° F. and 450° F. with a catalyst comprising a tungsten containing heteropoly acid on a solid support comprising at least 50 weight percent silica.

---

This invention relates to an improved process for the alkylation of an aromatic hydrocarbon with an olefinic organic compound. In particular, this invention relates to the use of a novel alkylation catalyst comprising a tungsten containing heteropoly acid on a support comprising at least 50 weight percent silica.

The alkylation of aromatic hydrocarbons with olefins is old in the art. The processes of the prior art suffer, however, from certain disadvantages, such as the use of higher reaction temperatures, poor selectivity to monoalkylated aromatics, or the use of expensive unsupported catalysts. It was formerly believed that supported heteropoly acids could not successfully be employed as catalysts for the alkylation of aromatics since alumina supported heteropoly acids were substantially inactive. The use of anhydrous $AlCl_3$ and HF as alkylation catalysts suffer the obvious disadvantages of corrosion and handling difficulties.

It has been found, in accordance with the invention, that excellent yields of mono-alkylate are obtained by a process comprising contacting a mixture of an aromatic hydrocarbon having at least one alkylatable position open on a ring and an olefinic organic compound at a temperature between 100° and 450° F. with a catalyst comprising a tungsten containing heteropoly acid deposited on a solid support comprising at least 50 weight percent silica.

The catalyst for use in the process of this invention is a tungsten containing heteropoly acid deposited on a solid carrier comprising at least 50 percent silica. The term "polyacid" is conventionally used to designate complex acids which contain several acidic radicals. Isopoly acids are generally regarded as polyacids containing one kind of acid radical. Heteropoly acids, on the other hand, result when two or more molecules of two or more acids combine with the elimination of water. Heteropoly acids are described in volume 7 of the Kirk-Othmer Encyclopedia of Chemical Technology, pages 458 et seq. and the references therein. The heteropoly acids are soluble in oxygenated hydrocarbons, such as ethers, and are formed by the union of certain inorganic acid anhydrides, such as $WO_3$ and $MO_3$ with a second inorganic acid which is regarded as the parent acid as it supplies a central ion or atom of the final complex ion. Varying numbers of the acid anhydride molecules are combined with the parent acid in heteropoly acids, but usually 6 or 12 groups of $WO_3$, for example, unite with the parent acid to form the heteropoly acid. The heteropoly acids contain water of constitution and may contain water of hydration. Examples of suitable tungsten containing heteropoly acids include: 12-tungstophosphoric acid (phosphotungstic acid); 12-tungstosilicic acid (silicotungstic acid); 12-tungstoboric acid (borotungstic acid); 9-tungstophosphoric acid; 10-tungstosilicic acid; 9-tungstoarsenic acid; silicotungstomolybdic acid; silicotungstovanadic acid; phosphotungstomolybdic acid; phosphotungstovanadic acid; borotoungstomolybdic acid; and aluminotungstic acid.

The tungsten containing heteropoly acid is deposited on a solid support consisting at least 50 weight percent silica percent silica in order to prepare a catalyst which is suitable for the process of this invention. It has been found quite unexpectedly that in order for the tungsten containing heteropoly acid to be active for the alkylation process of this invention, the solid support on which the tungsten containing heteropoly acid is deposited must contain at least about 50 weight percent silica. The use of alumina which is a conventional support for many refinery processes including alkylation has been found to be substantially inactive when used as a support for the tungsten containing heteropoly acid and subsequently used for the alkylation of aromatics with olefins. Data for this will be presented later. Silica gel is the preferred support, however, mixed gels containing at least about 50 weight percent silica can also be employed. For example, silica-alumina gels have been found suitable as a support for the tungsten containing heteropoly acid catalyst used for the alkylation process of this invention. Since it is known that strong alkalies progressively degrade the heteropoly acids, the catalyst support should be substantially free of alkali.

The heteropoly acid can be deposited on the support by any means well known in the art. For example, one suitable procedure is to impregnate the support material using a water solution of the acid followed by drying the catalyst at temperatures of say 250° F. The catalyst is then calcined prior to use by heating to a temperature between about 400° F. and 700° F.

The amount of the tungsten containing heteropoly acid can suitably be between 5 and 35 weight percent of the catalyst, and is preferably between about 15 and 25 weight percent. The most preferred heteropoly acid concentration is about 20 weight percent of the solid support. In general, it was found that the activity of tungsten containing heteropoly acid catalysts decreases as the acid content is lowered. Catalysts containing 20 percent silicotungstic acid on silica gel, for example, result in olefin conversions of over 90 percent. When the heteropoly acid content was decreased to 10 percent, the olefin conversion decreased to 74 percent. Conversion was further reduced to 53 percent when only 5 percent of the silicotungstic acid was deposited on the support.

The charge stock for the process of this invention comprises a mixture of an aromatic hydrocarbon having at least one alkylatable position open on a ring and an olefinic organic compound. Any aromatic hydrocarbon substituted or unsubstituted can suitably be employed. It is preferred that the aromatic hydrocarbon have less than three condensed rings. Mono-cyclic aromatic hydrocarbons are particularly preferred and the most preferred aromatic hydrocarbon is benzene. Substituents, such as alkyl groups, halogens, $NO_2$, —OH etc. can be present on the ring, the only criteria being that at least one alkylatable position be still open on the ring. By an alkylatable position is meant, of course, one that is not blocked by steric hindrance or otherwise from reacting with an olefinic hydrocarbon. Alkylatable aromatic hydrocarbons are generally well known in the art and generally contain between 6 and about 30 carbon atoms per molecule.

Suitable aromatic hydrocarbons include, but are not limited to, benzene, toluene, ortho, meta and para xylene, naphthalene, tetralin, chlorobenzene, cumene, phenol, nitrobenzene, 1-methyl-5-octylbenzene, ethylbenzene, tertiary-butylbenzene and dodecylbenzene.

Any olefinic organic compound can suitably be used in the process of this invention. The process of this invention is particularly applicable to the use of the higher carbon number linear olefinic hydrocarbons, such as those having between 8 and 20 carbon atoms per molecule. However, olefins having between 2 and 40 carbon atoms per molecule can be employed. By the term "olefin" in this application is meant mono- or polyolefinic organic compounds. Monoolefins are preferred and in particular, alphamonoolefins in order to encourage alkylation and inhibit the polymerization of the olefinic molecules or polyalkylation.

A suitable list of olefinic hydrocarbons include, but is not limited to, ethylene, propylene, butene-1, cis-2-butene, trans-2-butene, isobutene, pentene-1, cis-2-pentene, trans-2-pentene, hexene-1, cis-2-hexene, trans-2-hexene, octene-1, nonene-1, decene-1, 4-ethyl-2-hexene, 3,7-dimethyl-1-octene, propylene trimer, tetrapropylene, 2,4-diethyl-2-hexene, 1-undecene, 1-tridecene, tetraisobutylene, 1-octadecene, 1-heptacosene, 1,2-pentadiene, 2-methyl-1,3-butadiene and 1,5-octadiene.

The preferred olefins are the linear alpha olefins containing between 8 and 20 carbon atoms per molecule, and particularly preferred are the linear alpha monoolefins containing between 10 and 16 carbon atoms per molecule, such as dodecene-1, since detergent alkylate can be made from these olefins when benzene is used as the aromatic hydrocarbon.

The molar ratio of the aromatic compound to the olefinic hydrocarbon can vary between about 1:1 and 25:1 but is preferably between 7:1 and 12:1. The most preferred ratio is 9:1. The lower molar ratios of aromatic compound to olefinic hydrocarbon promote unwanted side reactions, such as polymerization, whereas the use of higher ratios above about 12:1 result in poor yields of alkylate per reactor volume.

The alkylation reaction is run by contacting the mixture of aromatic compound and olefinic hydrocarbon with the supported heteropoly acid catalyst defined above. The contacting can be performed in any suitable manner. One suitable procedure is to pass the charge mixture downflow through a column of catalyst granules under the alkylation conditions to be defined below.

The alkylation temperature can suitably be between 100° and 450° F. with a preferred alkylation temperature being between 200° and 400° F. The conversion of olefin drops off rapidly as the temperature drops below 200° F. The conversion at 200° F. of dodecene-1 was over 97 weight percent, but when the reaction temperature was reduced to 150° F., the conversion of dodecene-1 was only about 15 weight percent. Temperatures above about 450° F. are undesirable since they promote unwanted side reactions, such as polymerization and aromatization of the olefin.

The operating pressure is not critical and can vary between 0 and 1000 p.s.i.g. It is preferred that the reaction pressure be sufficient to maintain the reactants in the liquid phase, but this is not essential, especially when the lower boiling olefinic materials are employed. Generally, a sufficient pressure will be used to maintain at least part of the reactants in the liquid phase as this exerts a beneficial washing effect on the catalyst. Pressures between 200 and 500 p.s.i.g. have been found satisfactory for the alkylation of dodecene-1 with benzene.

The liquid hourly space velocity can vary between about 0.25 and 20 or more with preferred liquid hourly space velocities between 0.5 and 3.0. As usual, increased space velocities at constant temperature results in decreased conversions.

The invention will be further described with reference to the following experimental work.

The alpha olefin used in all of the experiments was a commercial dodecene-1 which had a $C_{12}$ content of 93.8 percent by weight. The remainder was made up of equal amounts of a $C_{10}$ and $C_{14}$ alpha olefin. Table I below shows the inspections of the olefin charge stock.

TABLE I.—PHYSICAL PROPERTIES AND ANALYSIS OF DODECENE-1 BLEND FOR ALKYLATION OF BENZENE WITH DODECENE

| | |
|---|---|
| Color, D 156 | 31 |
| FIA, D 1319: | |
| Saturates, percent by volume | 1.7 |
| Olefins, percent by volume | 98.3 |
| Density at 20° C., D 941 | 0.7585 |
| Refractive index at 20° C. | 1.42984 |
| Peroxide No. | 0.1 |
| Water, p.p.m. | 31 |
| Saturates, percent by wt. | 2.6 |
| Carbon No. distribution, percent by wt.: | |
| $C_{10}$ | 3.0 |
| $C_{12}$ | 93.8 |
| $C_{14}$ | 3.2 |
| Infrared analysis, mole percent: | |
| Trans RCH=CHR | 0.0 |
| Cis RCH=CHR | 0.0 |
| RCH=$CH_2$ | 95.8 |
| $R_2C$=$CH_2$ | 3.8 |
| $R_2C$=CHR | 0.5 |

The aromatic hydrocarbon employed was reagent grade benzene. A fixed bed reactor was employed with downflow operation utilizing a 10 to 20 mesh granule catalyst.

*Example 1*

In the run for this example, a mixture of benzene and dodecene-1 (a 9:1 mol ratio of benzene to dodecene-1) was passed downflow through a bed of 10 to 20 mesh granules of a catalyst consisting of 20 weight percent silicotungstic acid on a silica gel support at a temperature of 250° F., a reaction pressure of 500 p.s.i.g., and a liquid hourly space velocity based on the entire charge of 1.0. The properties of the silica gel support are given on Table II below.

TABLE II.—PROPERTIES OF SUPPORTS

| | Support | | |
|---|---|---|---|
| | Davison Chemical Co Grade 70 Silica Gel | Harshaw Chemical Co. | |
| | | Al 1706 | Al 1906 |
| Surface Area (BET), m.²/gm | 313 | 263 | 237 |
| Pore Volume, ml./gm | 1.20 | 0.64 | 0.69 |
| Average Pore Radius in Degrees Angstrom | 85 | 50.8 | 64.8 |
| Na Content, Wt. Percent | 0.027 | 0.045 | 0.040 |

The dodecene conversion was over 98 percent by weight and the selectivity to mono-alkylate was over 90 percent.

The results of this example are summarized on Table III below.

Example 2

Example 1 was repeated except the base for the silicotungstic acid was an alumina designated as Al 1906. The conversion was almost negligible being only 3.7 weight percent. The results of this run are also summarized on Table III below.

Example 3

Example 1 was repeated except the reaction temperature was increased to 300° F. The conversion of dodecene and the selectivity to the mono-alkylate were almost identical with the results in Example 1. The results are summarized on Table III below.

Example 4

Example 3 was repeated except the silicotungstic acid was supported on an alumina designated as Al 1706 rather than silica gel and the reaction pressure was 200 p.s.i.g. The properties of the alumina are given on Table II above. The conversion of dodecene-1 increased but was still very low being only 22 percent by weight. The results of this run are also shown on Table III below.

Referring to Table III, a comparison of the results of Examples 1 through 4 shows the criticality of employing a silica gel rather than an alumina support for the catalysts to be used in the process of this invention. The alumina supported heteropoly acid catalysts were for all practical purposes inactive.

Example 5

Example 1 was repeated except the catalyst support was a silica-alumina containing 90.0 weight percent silica. The dodecene-1 conversion using this catalyst was 89.1 percent by weight and the selectivity to the mono-alkylate was over 92 weight percent. The results of this run are shown in Table III below.

Example 6

Example 3 was repeated except the reaction pressure was reduced to 200 p.s.i.g. and the catalyst support was again a silica-alumina containing 90.0 weight percent silica. The conversion of dodecene-1 was 96.9 percent by weight with a selectivity to the mono-alkylate of 89 percent. The results of this run are also summarized in Table III.

The results of Examples 5 and 6 show that the support does not have to be exclusively silica gel but a portion of the silica can be replaced with other metal oxides, such as alumina. The density of the silica gel was about half the density of the alumina or silica-alumina bases. As a consequence, an additional advantage is gained by the use of pure silica gel in that only half as much of the silicotungstic acid would be required for any given volume of catalyst to be installed in a reactor.

TABLE III

[Catalyst: 20% silicotungstic acid on a support]

| | Example No. | | | | | |
|---|---|---|---|---|---|---|
| | 1 | 2 | 3 | 4 | 5 | 6 |
| | Catalyst Support | | | | | |
| | Silica Gel [1] | Al 1906 Alumina | Silica Gel [1] | Al 1706 Alumina | Silica Alumina | Silica-Alumina |
| Reaction Temperature, °F | 250 | 250 | 300 | 300 | 250 | 300 |
| Reaction Pressure, p.s.i.g | 500 | 500 | 500 | 200 | 500 | 200 |
| Space Velocity, LHSV | 1.0 | 1.0 | 1.0 | 1.0 | 1.0 | 1.0 |
| Feed Mol Ratio, Benzene/Dodecene | 9/1 | 9/1 | 9/1 | 9/1 | 9/1 | 9/1 |
| Dodecene Conversion, percent by Weight | 98.6 | 3.7 | 98.3 | 22.4 | 89.1 | 96.9 |
| Dodecene Selectivity, percent by Weight: | | | | | | |
| To Monoalkylate | 90.4 | 84.0 | 92.0 | 81.6 | 92.5 | 89.0 |
| To Dimer | 0.0 | 16.0 | 0.0 | 13.4 | 1.1 | 1.8 |
| To Dialkylate | 9.6 | 0.0 | 8.0 | 5.0 | 6.4 | 9.2 |
| Benzene Conversion, percent by Weight | 10.1 | 3.0 | 10.3 | 3.4 | 10.2 | 10.3 |
| Benzene Selectivity, percent by Weight: | | | | | | |
| To Monoalkylate | 95.0 | 100.0 | 95.9 | 97.0 | 96.7 | 95.1 |
| To Dialkylate | 5.0 | 0.0 | 4.1 | 3.0 | 3.3 | 4.9 |

[1] Davison Grade 70.

Several runs were made to determine the effect of reducing the concentration of silicotungstic acid on the silica gel support. The results of these runs are shown on Table IV below. Referring to Table IV, Examples 7 and 8 were exactly the same as Example I above except only 10 and 5 weight percent silicotungstic acid was deposited respectively on the silica gel support. Example 1 is included also on Table IV for ease in comparison of the data. As the heteropoly acid content decreases on the support, the conversion of dodecene-1 also decreases from 98.6 percent for the 20 percent silicotungstic acid catalyst to a low of 53.3 weight percent for the 5 percent silicotungstic acid catalyst (Example 7). The selectivity to the mono-alkylate is not effected being above 90 weight percent in all cases.

TABLE IV

| | Example No. | | |
|---|---|---|---|
| | 1 | 7 | 8 |
| | Catalyst Support | | |
| | Silica Gel [1] | Silica Gel [1] | Silica Gel [1] |
| Wt. percent Silicotungstic Acid | 20 | 10 | 5 |
| Reaction Temperature, °F | 250 | 250 | 250 |
| Reaction Pressure, p.s.i.g | 500 | 500 | 500 |
| Space Velocity, LHSV | 1.0 | 1.0 | 1.0 |
| Feed Mol Ratio, Benzene-Dodecene | 9/1 | 9/1 | 9/1 |
| Dodecene Conversion, percent by Weight | 98.6 | 74.0 | 53.3 |
| Dodecene Selectivity, percent by Weight: | | | |
| To Monoalkylate | 90.4 | 91.1 | 90.0 |
| To Dimer | 0.0 | 4.6 | 5.9 |
| To Dialkylate | 9.6 | 4.3 | 4.1 |
| Benzene Conversion, percent by Weight | 10.1 | 9.3 | 7.2 |
| Benzene Selectivity, percent by Weight: | | | |
| To Monoalkylate | 95.0 | 97.6 | 97.7 |
| To Dialkylate | 5.0 | 2.4 | 2.3 |

[1] Davison Grade 70.

Runs were also made (Examples 9 and 10) at 200° and 150° F. with the catalyst of Example 1 to compare with the results at 250° and 300° F. as shown in Examples 1 and 3 respectively above. The results of the temperature series are shown in Table V below. Examples 1 and 3 are repeated for ease of comparison of the data. Dodecene-1 conversions are all over 95 percent at reaction temperatures between 200° and 300° F., but the dodecene conversion drops off rapidly to a value of only 14.9 percent at a reaction temperature of 150° F. (see Example 10 on Table V below). The selectivity to the mono-alkylate is high even though the reaction temperature is decreased. A reaction temperature of 200° F. (Example 9) appears to be as suitable as a reaction temperature of 300° F.

TABLE V

|  | Example No. | | | |
|---|---|---|---|---|
|  | 1 | 3 | 9 | 10 |
|  | Catalyst Support | | | |
|  | Silica Gel [1] | Silica Gel [1] | Silica Gel [1] | Silica Gel [1] |
| Reaction Temperature, ° F | 250 | 300 | 200 | 150 |
| Reaction Pressure, p.s.i.g | 500 | 500 | 500 | 500 |
| Space Velocity, LHSV | 1.0 | 1.0 | 1.0 | 1.0 |
| Feed Mol Ratio, Benzene/Dodecene | 9/1 | 9/1 | 9/1 | 9/1 |
| Dodecene Conversion, percent by Weight | 98.6 | 98.3 | 97.9 | 14.9 |
| Dodecene Selectivity percent by Weight: | | | | |
| To Monoalkylate | 90.4 | 92.0 | 90.4 | 88.0 |
| To Dimer | 0.0 | 0.0 | 0.2 | 12.0 |
| To Dialkylate | 9.6 | 8.0 | 9.4 | 0.0 |
| Benzene Conversion, percent by Weight | 10.1 | 10.3 | 10.8 | 2.9 |
| Benzene Selectivity, percent by Weight: | | | | |
| To Monoalkylate | 95.0 | 95.9 | 95.0 | 100.0 |
| To Dialkylate | 5.0 | 4.1 | 5.0 | 0.0 |

[1] Davison Grade 70.

*Example 11*

Example 1 was repeated except the reaction pressure was lowered to 200 p.s.i.g. The results were substantially the same as in Example 1 showing that a reduction in pressure has little to no effect between 500 and 200 p.s.i.g. The results of this run are summarized in Table VI below.

*Example 12*

Example 1 was repeaten except the space velocity was reduced to 0.5 LHSV. The results are also summarized in Table VI below and were substantially the same as the results for Example 1.

*Example 13*

Example 1 was repeated except the space velocity was increased to 2.0. These results are also summarized on Table VI below and show that an increased space velocity to 2.0 results in a decrease in the conversion of dodecene-1 to 84.3 percent from a conversion of 98 percent (Example 1) at a space velocity of 1.0.

*Example 14*

Example 1 was repeated except the mol ratio of benzene to dodecene-1 was reduced from 9:1 to 4:1. The results of this run are also summarized in Table VI below. Referring to Table VI, and comparing Examples 1 and 14, it can be seen that a reduction of the mol ratio of benzene to dodecene-1 results in about the same conversion (98 percent vs. 95 percent) but a decrease in selectivity to the mono-alkylate 90.4 percent in Example 1 versus only 76.4 percent in Example 14.

*Example 15*

Example 1 was repeated except the mol ratio of benzene to dodecene-1 was increased to 15:1. The results are summarized in Table VI below. Referring to Table VI, and comparing Examples 1 and 15, it can be seen that increasing the mol ratio of benzene to dodecene-1 results in about the same conversion and selectivity of dodecene-1. There, therefore, does not appear to be any particular advantage in increasing the molar ratio of aromatic to olefin above about 9:1.

*Example 16*

Example 1 was repeated except the heteropoly acid was phosphotungstic acid. The results are summarized on Table VI below. Referring to Table VI and comparing Examples 1 and 15, it can be seen that the use of phosphotungstic acid in place of silicotungstic acid results in a decrease in conversion of the dodecene-1 from 98 to 93 percent and a decrease in selectivity from 90 to 88.1 percent to the mono-alkylate. A comparison of Examples 1 and 16 shows that the silicotungstic acid is a preferred tungsten containing heteropoly acid to be used in the process of this invention.

TABLE VI

| Example No | 1 | 11 | 12 | 13 | 14 | 15 | 16 |
|---|---|---|---|---|---|---|---|
| Catalyst Support | Davison Grade 70 Silica Gel | | | | | | |
| Heteropoly Acid | ([1]) | ([1]) | ([1]) | ([1]) | ([1]) | ([1]) | ([2]) |
| Reaction Temperature, ° F | 250 | 250 | 250 | 250 | 250 | 250 | 250 |
| Reaction Pressure, p.s.i.g | 500 | 200 | 500 | 500 | 500 | 500 | 500 |
| Space Velocity, LHSV | 1.0 | 1.0 | 0.5 | 2.0 | 1.0 | 1.0 | 1.0 |
| Feed Mole Ratio, Benzene/Dodecene | 9/1 | 9/1 | 9/1 | 9/1 | 4/1 | 15/1 | 9/1 |
| Dodecene Conversion, Percent by Weight | 98.6 | 98.6 | 96.2 | 84.3 | 95.1 | 98.5 | 93.2 |
| Dodecene Selectivity, Percent by Weight: | | | | | | | |
| To Monoalkylate | 90.4 | 92.5 | 91.6 | 91.5 | 76.4 | 91.5 | 88.1 |
| To Dimer | 0.0 | 0.3 | 0.0 | 4.9 | 13.1 | 2.7 | 4.9 |
| To Dialkylate | 9.6 | 7.2 | 8.4 | 3.6 | 10.5 | 5.8 | 7.0 |
| Benzene Conversion, Percent by Weight | 10.1 | 10.0 | 12.7 | 6.7 | 19.3 | 8.2 | 11.7 |
| Benzene Selectivity, Percent by Weight: | | | | | | | |
| To Monoalkylate | 95.0 | 96.2 | 95.6 | 98.0 | 95.3 | 97.8 | 96.2 |
| To Dialkylate | 5.0 | 3.8 | 4.4 | 2.0 | 6.5 | 2.2 | 3.8 |

[1] 20 Wt. Percent Silicotungstic.
[2] 20 Wt. Percent Phosphotungstic.

As can be seen from the above data, high conversions of the olefinic hydrocarbon, in addition to excellent selectivity, to the mono-alkylate can be obtained by the use of a tungsten containing heteropoly acid deposited on a support containing at least 50 weight percent silica at a temperature between about 150 and 400° F. The use of other supports, such as alumina, results in little to no conversion of olefin to alkylate.

Resort may be had to such variations and modifications as fall within the spirit of the invention and the scope of the appended claims.

We claim:
1. A process for the alkylation of an aromatic hydrocarbon having at least one alkylatable position open on a ring which comprises contacting said aromatic hydrocarbon in admixture with an olefinic organic compound at a temperature between 100° F. and 450° F. with a catalyst comprising a tungsten containing heteropoly acid on a solid support comprising at least 50 weight percent silica.

2. A process according to claim 1 wherein the aromatic hydrocarbon is a mono-nuclear aromatic hydrocarbon.

3. A process according to claim 2 wherein the mononuclear aromatic hydrocarbon is benzene.

4. A process according to claim 2 wherein the olefinic organic compound is a linear olefinic hydrocarbon having between 8 and 20 carbon atoms per molecule.

5. A process according to claim 4 wherein the olefinic organic compound is a linear alpha olefinic hydrocarbon having between 10 and 16 carbon atoms per molecule.

6. A process according to claim 5 wherein the linear alpha olefin is dodecene-1.

7. A process according to claim 1 wherein the catalyst comprises between 5 and 25 weight percent of a tungsten containing heteropoly acid on a silica gel support.

8. A process according to claim 1 wherein the catalyst comprises between 5 and 25 weight percent of a tungsten containing heteropoly acid on a silica-alumina support wherein the amount of silica is at least 50 weight percent.

9. A process according to claim 1 wherein the tungsten containing heteropoly acid is silicotungstic acid.

10. A process according to claim 1 wherein the tungsten containing heteropoly acid is phosphotungstic acid.

11. A process for the alkylation of benzene with a linear alpha olefin having between 10 and 16 carbon atoms which comprises passing a mixture of benzene and said alpha olefin in a molar ratio of at least 1:1 through a bed of the catalyst comprising a tungsten containing heteropoly acid on a solid support comprising at least 50 weight percent silica at a pressure sufficient to keep the benzene in the liquid phase and at a temperature between 200° and 400° F. and a space velocity between about 0.25 and 2.0.

12. A process according to claim 11 wherein the catalyst comprises between 5 and 25 weight percent silicotungstic acid on silica gel.

13. A process according to claim 12 wherein the linear alpha olefin is dodecene-1.

14. A process according to claim 1 wherein said catalyst is calcined at a temperature between 400° and 700° F. before use.

15. A process according to claim 4 wherein said catalyst is calcined at a temperature between 400° and 700° F. before use.

16. A process according to claim 7 wherein said catalyst is calcined at a temperature between 400° and 700° F. before use.

17. A process according to claim 8 wherein said catalyst is calcined at a temperature between 400° and 700° F. before use.

18. A process according to claim 16 wherein said silica gel has a surface area of about 300 square meters per gram.

19. A process for the alkylation of an aromatic hydrocarbon having at least one alkylatable position open on a ring which comprises contacting said aromatic hydrocarbon in admixture with an olefinic organic compound at a temperature between 100° F. and 400° F. with a catalyst consisting essentially of a tungsten containing heteropoly acid on a solid support comprising at least 50 weight percent silica.

References Cited
UNITED STATES PATENTS

| | | | |
|---|---|---|---|
| 2,301,966 | 11/1942 | Michel et al. | 260—671 X |
| 3,126,423 | 3/1964 | Kronig et al. | 260—671 |

DELBERT E. GANTZ, *Primary Examiner.*

C. R. DAVIS, *Assistant Examiner.*